(No Model.) 2 Sheets—Sheet 1.
F. B. RAE.
CONDUIT RAILWAY.
No. 492,106. Patented Feb. 21, 1893.
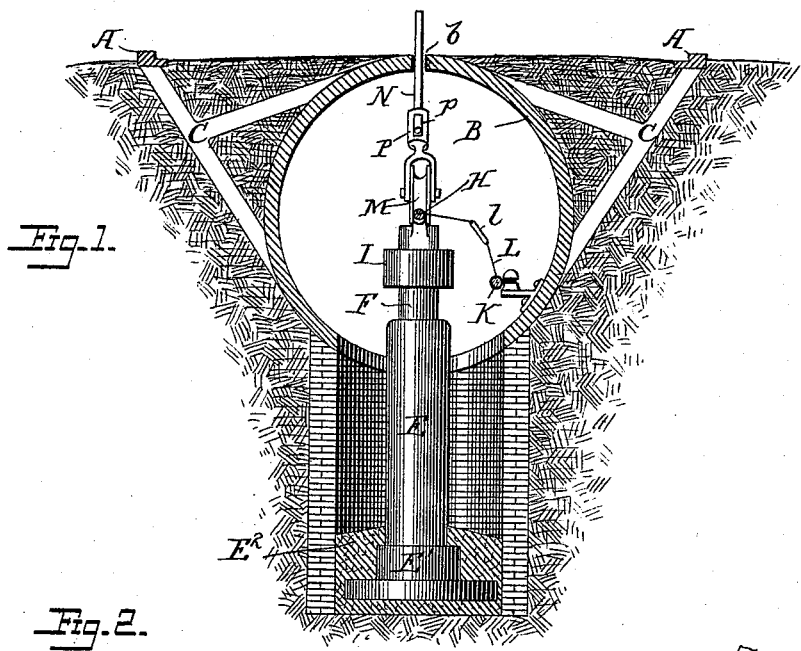
Fig. 1.
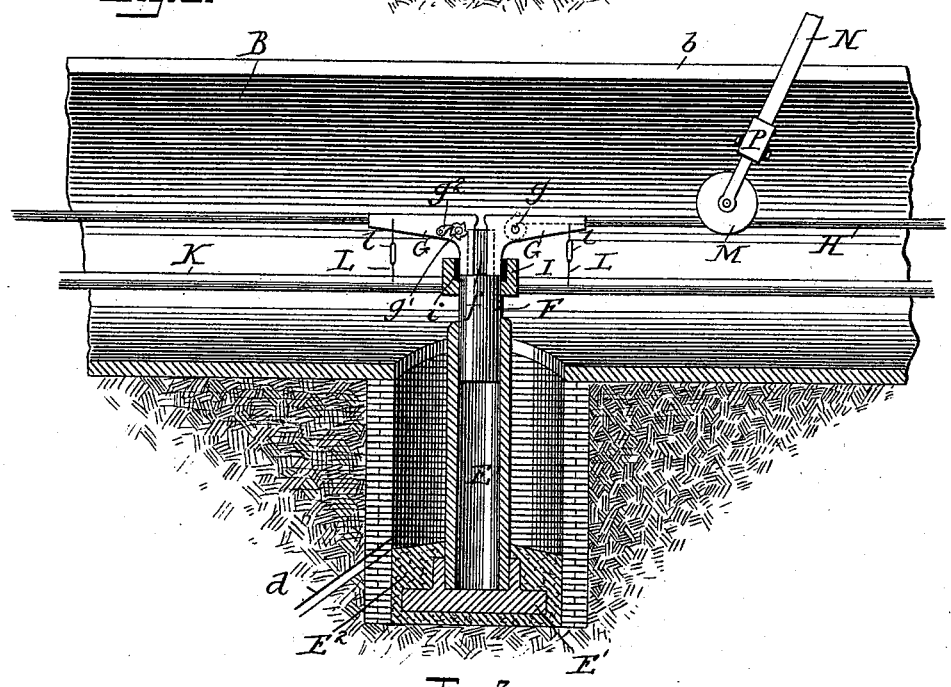
Fig. 2.
Fig. 3.
WITNESSES
Jno. G. Hinkel
H. S. McArthur
INVENTOR
Frank B. Rae
by Foster Freeman
Attorneys (No Model.) 2 Sheets—Sheet 2.

F. B. RAE.
CONDUIT RAILWAY.

No. 492,106. Patented Feb. 21, 1893.

WITNESSES
Jno. G. Hinkel
H. S. McArthur

INVENTOR
Frank B. Rae
by Foster Freeman
Attorneys

UNITED STATES PATENT OFFICE.

FRANK B. RAE, OF DETROIT, MICHIGAN, ASSIGNOR TO THE DETROIT ELECTRICAL WORKS, OF SAME PLACE.

CONDUIT RAILWAY.

SPECIFICATION forming part of Letters Patent No. 492,106, dated February 21, 1893.

Application filed April 11, 1891. Serial No. 388,469. (No model.)

*To all whom it may concern:*

Be it known that I, FRANK B. RAE, a citizen of the United States, residing at Detroit, in the county of Wayne and State of Michigan, have invented certain new and useful Improvements in Underground Systems for Electric Railways, of which the following is a specification.

My invention relates to underground systems of electric railways and has for its object to improve and simplify their construction and arrangement, and my invention is carried out by devices, substantially such as are hereinafter more particularly described.

Figure 4:
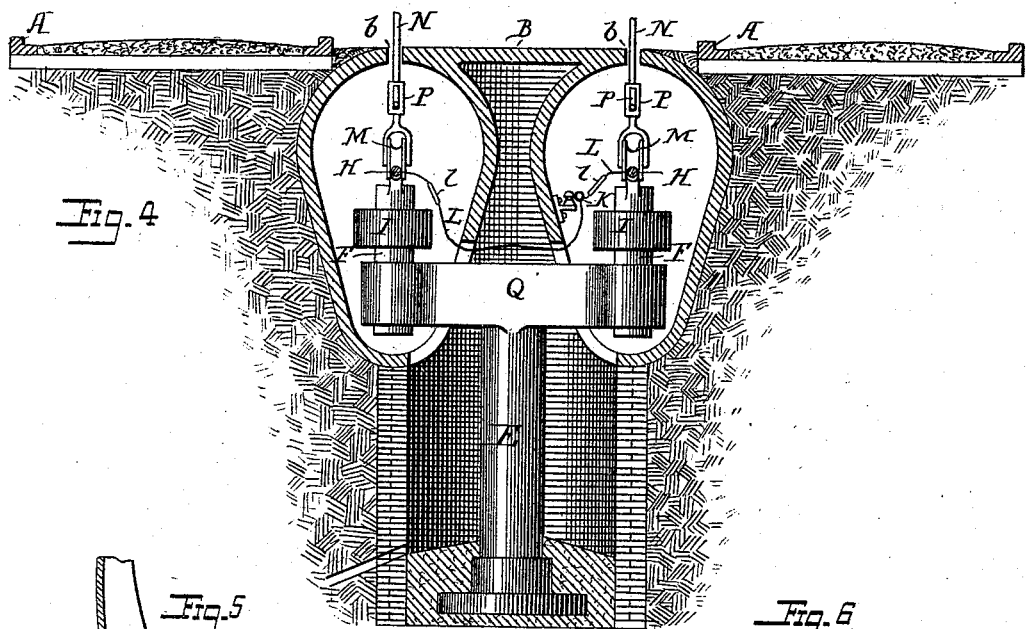
Figure 5:
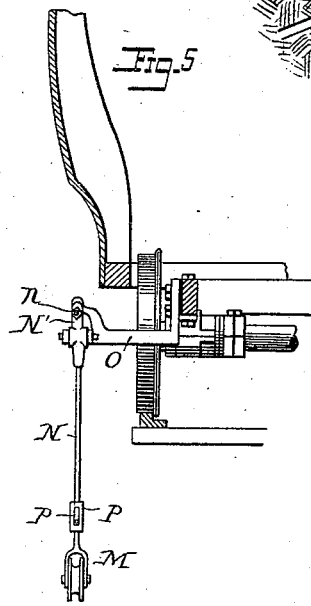
Figure 7:
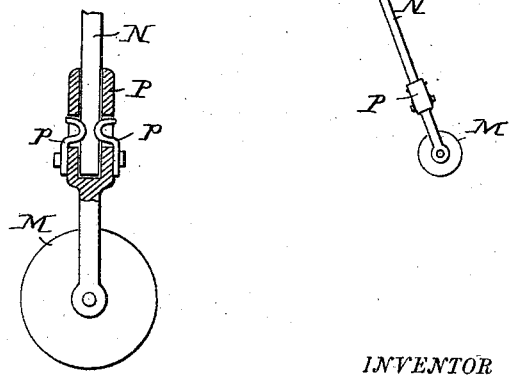
Figure 6:
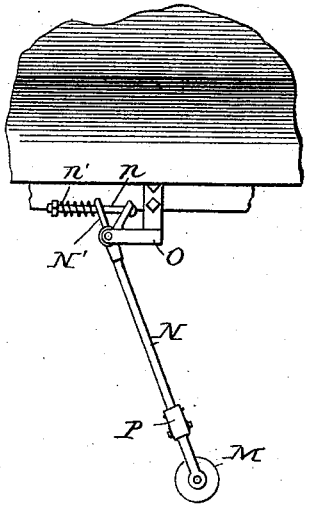

Referring to the accompanying drawings, Figure 1, is a transverse section of a single track railway showing the conduit and trolley wire supporting devices; Fig. 2, is a longitudinal section of the same; Fig. 3, is a longitudinal section showing two well holes, and means for draining the conduit; Fig. 4, is a transverse section of a double trackway with my invention applied thereto; Fig. 5, is a detailed view showing a portion of the car with the trolley arm attached; Fig. 6, is a side view of the same; and Fig. 7, shows one means of attaching the trolley to the trolley arm.

Most of the underground trolley systems as heretofore constructed have objectionable features which interfere with their successful operation, and one of these features is the leakage of current from the trolley wire to the conduit or to ground, the conductor in the conduit being exposed to moisture, either from rains, floods, or condensation, or other reasons, and as the trolley wire is usually supported at short distances, each one of these supports becomes a fruitful source of leakage.

It is one of the essential and principal objects of my invention to provide against this leakage of current, and in doing this I provide an underground system, which will be substantially the same as that now commonly used overhead, and in which the supports for the trolley wire are at considerable distances apart, the conductor consisting of a wire stretched tightly between these supports, and the supports are made with a small cross section with a considerable length between the point of support of the conductor, and the ground, so that the whole system shall have a high insulating resistance, and not be subject to the losses from leakage. With this general object in view, I have illustrated one way of carrying out my invention, whereby these results are produced, and while I shall describe what I consider to be the preferable construction and arrangement of parts, it will be understood that the objects of my invention may be accomplished by other details of construction and arrangement.

In the drawings A, A, represent each of the rails of a track, and B, represents a conduit which is preferably constructed of some insulating material such as brick lined with asphalt, and this, especially when used with a single track as shown in Fig. 1, where it is preferably laid between the rails of the track, is provided with suitable braces or supports C, C, which tend to maintain the rails in proper position, as well as to aid in supporting the conduit, and preventing the slot $b$ becoming closed from pressure or otherwise on the roof of the conduit. A suitable distance apart, say a hundred feet or more, I provide well holes D, which are also preferably constructed of masonry, and are of considerable depth, depending somewhat upon the nature of the streets, and depth of sewers or pipes &c., but I find it preferable to make them several feet in depth below the bottom of the conduit whenever practicable. These well holes are connected by suitable pipes or openings $d$, with the sewer, and the conduit B between two adjacent well holes is depressed toward the central point as shown in Fig. 3, where it is connected to the sewer by a drain pipe $d'$, so that any moisture in the conduit has a tendency to flow away from the well holes, and be discharged into the sewer without running into the well holes, but whatever moisture does reach the well holes is quickly discharged through the drain pipes attached to each. In this way the minimum amount of moisture will pass to the well holes, and will consequently interfere in the least possible degree with the insulating supports of the trolley wire hereinafter described. In these well holes I place a trolley wire support E, which is shown in the present instance as being in tubular form, and of some substantial material, being supported by a base piece $E'$ and embedded in a mass of non-conducting material E², as asphalt, so that the support E is thoroughly and fully insulated. Mounted in this support and especially when it is made of metal is a block or plug F, preferably of wood, which may be saturated with insulating material or otherwise rendered thoroughly insulated and non-absorbent of moisture. Upon this plug or block are mounted the supports G for the trolley wire sections H, and while these supports may be variously constructed, I preferably make them of cast metal, and I have shown them as fitting the extension $f$ of the plug, and being secured in position by a collar I, insulating material $i$ being molded into the collar to hold the supports in position, and thoroughly insulate them from each other. The ends of the trolley wire H are secured to these supports, one end for instance, being wound around a pin or lug $g$, so that it is securely held thereon, while the other end of the trolley section is mounted on a rod $g'$ having a pawl and ratchet $g^2$ by means of which the trolley wire may be stretched between the two successive supports and held in a practically horizontal position. In this way it will be seen that the trolley wire sections are of considerable length, and are supported only at their ends, and are tightly strung so as to be substantially parallel, and are so mounted on their supports that there is the least liability of leakage to ground through moisture collecting on the supports from any cause, and I have practically arranged the elements of an overhead system in an underground conduit, attaining all the advantages of the former system, and avoiding many of the disadvantages of the latter system.

Extending through the main conduit, and supported in any suitable way, preferably upon the side wall, is the main feeding conductor K, which is thoroughly insulated, and which at suitable intervals, and preferably at the well holes, is tapped and connected to the trolley line sections by means of a conductor L, having a fusible plug $l$, so that in the event of one section of the trolley wire being broken or grounded from any cause, these plugs will be destroyed, and cut off this section from the main feeding conductor. The trolley wheel M runs on the trolley wire, being attached to the trolley arm N, mounted on the car, and in Figs. 5 and 6, I have shown the preferred means of mounting it in which a brace O is attached to the truck frame, in this instance to the outside, it being intended for a double track road and pivotally mounted in said brace is the arm N, the upper end of which surrounds a rod $n$ on which is a spring $n'$ tending to hold the trolley wheel in contact with the trolley wire, but allowing the arm to yield to accommodate the trolley to the motions of the car and inequalities of the road or conductor. When this trolley is used on a single track road, the bracket or brace O will of course be between the wheels, but when the conduit is between the two tracks, it may be mounted on the outside of the frame, and extend over the slot in the conduit, and if the car is to run on both tracks without being turned, of course the bracket will be duplicated and arranged on each side of the truck.

In order to provide against breaking the parts in case of an accidental obstruction to the passage of the trolley arm, I connect the trolley wheel to the arm by a bayonet or spring joint, a practical form being illustrated in Fig. 7, in which the socket P, receives the end of the trolley arm O, which latter is retained in position by the springs $p$, bearing in notches near the end of the trolley arm, the pressure of these springs being sufficient to hold the trolley in position under ordinary circumstances, but in case of an obstruction, the arm may be withdrawn from the socket, when the trolley will fall to the bottom of the conduit, and not be liable to short circuit the trolley wire.

In Fig. 4, I have shown substantially the same arrangement as I have heretofore described applied to a double track, the conduits being arranged between the tracks and preferably made separate, each conduit having its own individual slot, and in order to carry this out, it is only necessary to interpose between the support E and the plugs F, a cross arm Q which extends into each of the conduits, and holds the plugs and their trolley wire supports. Under these circumstances, the conduits are preferably made oval in shape, both for strength and for convenience, the central wall being common to both of the conduits. In this arrangement it will be understood that each of the trolley conductors in this double conduit are of the same polarity, and it is therefore necessary to have only one main feeding conductor K, as the rails of each track are intended to be used for the return circuit.

What I claim is—

1. In an underground conduit system for electric railways, the combination with a conduit having a series of well holes in its bottom, of insulated supports mounted in the well holes and extending upward into the conduit, and sections of the trolley wires having their ends connected to said supports, substantially as described.

2. In an underground conduit system for electric railways, the combination with the well holes, of supports embedded in insulating material therein, and extending into the conduit, a trolley wire in sections, the ends of the two adjacent sections being attached to the supports in the well holes, substantially as described.

3. In an underground conduit system for electric railways, the combination with the well holes and supports therein, of wooden blocks or plugs connected to said supports, trolley wire supports mounted on the block, and a collar, and insulating material between the collar and supports for the trolley wire, substantially as described.

4. In an underground conduit system for electric railways, the combination with the well holes, and insulated supports mounted therein, of the trolley wire sections having the ends of two adjacent sections connected to a support, a main feeding conductor in the conduit and fusible connections between the main feeding conductor and the trolley wire sections, substantially as described.

5. The combination with a slotted conduit having trolley wire sections mounted upon insulated supports therein, of a car having a bracket extending from the frame, a trolley arm pivotally mounted on the bracket, a detachable trolley wheel bearing on the trolley wire sections, the trolley arm being provided with an extension sliding over a rod and a spring on the rod bearing against the extension, substantially as described.

In testimony whereof I have signed my name to this specification in the presence of two subscribing witnesses.

FRANK B. RAE.

Witnesses:
  W. H. PERRETT,
  CHARLES J. STUBBS.